United States Patent [19]

Srivastava

[11] Patent Number: 5,194,940
[45] Date of Patent: Mar. 16, 1993

[54] FREQUENCY MULTIPLEXED DIGITAL VIDEO PROCESSOR

[75] Inventor: Gopal K. Srivastava, Arlington Heights, Ill.

[73] Assignee: Zenith Electronics Corporation, Glenview, Ill.

[21] Appl. No.: 771,278

[22] Filed: Oct. 3, 1991

[51] Int. Cl.$^5$ .................. H04N 9/77; H04N 9/78
[52] U.S. Cl. .................... 358/21.R; 358/31; 358/39; 358/40
[58] Field of Search .......... 358/21 R, 39, 40, 31, 358/38, 37

[56] References Cited

U.S. PATENT DOCUMENTS

| | | | |
|---|---|---|---|
| 4,245,237 | 1/1980 | Lagoni | 358/31 |
| 4,430,665 | 2/1984 | Cochran | 358/37 |
| 4,656,502 | 4/1987 | Hausdorfer | 358/37 |
| 4,860,090 | 8/1989 | Murata | 358/31 |

FOREIGN PATENT DOCUMENTS

144997 7/1986 Japan.
2124052 2/1984 United Kingdom ............. 358/31

Primary Examiner—Tommy P. Chin

[57] ABSTRACT

A television receiver includes a frequency multiplexed video processor which processes chrominance and luminance signals in response to synchronously detected composite video information. The composite video signal is separated into a plurality of frequency spectra which are individually processed utilizing digital electronic circuitry to achieve high performance and cost effectiveness. A comb filter is operative within one of the processors to provide separation of the luminance and chrominance information within the chrominance signal bandpass to maintain high frequency luminance signal components. A separate processor and bandpass filter are operative to provide separate control of the luminance peaking within the system. Conventional luminance and chrominance processing converts the output signals of the multiplexed processor to RGB video signals which are applied to a conventional cathode ray tube display having a conventional deflection system associated therewith.

19 Claims, 4 Drawing Sheets

FREQUENCY MULTIPLEXED DIGITAL VIDEO PROCESSOR

FIELD OF THE INVENTION

This invention relates generally to television receivers and particularly to the systems therein for processing luminance and chrominance information.

BACKGROUND OF THE INVENTION

Color television systems have been developed using several different broadcast and signal processing formats to achieve the successful transmission and reception of color television programming. While substantial differences between systems exist, they all must satisfy the basic objective of combining the picture or luminance information, the color or chrominance information, and sound information together with appropriate display scan synchronizing signals to form an information signal which may be modulated upon a carrier for transmission. At the receiver, the opposite processes must take place in which the several components of the information signal are separated and appropriately processed. In most television broadcast formats such as the NTSC system used within the United States of America and the PAL system used in many European countries, the signal components corresponding to luminance, chrominance and sound are distinguished from each other and separated for individual processing largely on the basis of signal frequencies. For example, in the NTSC system, the available broadcast bandwidth is maintained at 6 megahertz. To conserve channel bandwidth and to transmit up to 4.1 megahertz of video signal, a vestigial sideband format in which the carrier is off center within the 6 megahertz channel bandwidth is used. The chrominance information is modulated upon a chrominance subcarrier separated from the picture carrier by approximately 3.58 megahertz. The sound information is separated from the picture carrier by 4.5 megahertz. To further conserve channel bandwidth, the luminance signal and chrominance signal share a part of the channel bandwidth.

Thus, a low cost receiver is able to select the chrominance, sound and luminance signal portions by using appropriate frequency response networks or filters and thereafter perform individual processing thereon. Unfortunately, the frequency selection process used in most television receivers results in the loss of substantial amounts of information or image content. Perhaps the most notable loss occurs in the video or luminance information which is severely bandwidth limited as a result of the separation of chrominance and sound information. While these losses have been recognized as less than desirable, the basic filtering processes used in most television receivers has made improvement difficult or impractical. Many receivers employ analog glass delay line comb filter to separate luminance and chrominance information from the shared frequency spectrum. Since glass delay line does not provide accurate delay, factory alignments are needed to accurately separate luminance and chrominance signals.

One of the approaches contemplated by practitioners in the art seeking to improve the recovery of information at the receiver is found in the use of digital signal processing rather than the more pervasive presently used analog signal processing. Several advantages are provided by digital signal processing. For example, the separation of chrominance and luminance information in a digital environment may be carried forward using comb filters which use accurate delay and therefore accurately separate the luminance and the chrominance signals. Effective comb filters are more easily realized in the digital environment. In addition, a variety of information processing techniques which require memory for temporary storage of information are facilitated in a digital environment due to the ease with which memory may be achieved. Similarly, signal delays are relatively easy to perform in a digital signal environment. More generally, digital systems have evolved to a level of sophistication in which many digital systems have proven to be more economical to manufacture and have required fewer adjustments than their corresponding analog systems.

Despite the promise of advantages of the type set forth above to be realized by the application of digital electronic processing of television receiver signals, several problems and limitations have also arisen. For example, a fundamental bandwidth limitation is imposed upon digital processing circuits by the sample or clock rate which the system uses. Generally speaking, the sample or clock rate must be at least twice as large as the highest frequency signal component being processed. Unfortunately, increased sample or clock rates often results in dramatically increased system complexity which in turn increases costs. In addition, in broadcast formats such as the above-mentioned NTSC or PAL systems, the received information is analog information and thus the use of digital circuit processing thereon requires that the signals be converted from analog-to-digital signals. In most instances, the analog-to-digital conversion circuits used can only convert lower frequency components of the analog signal due to the practical limits of the sample rate. To convert higher frequency components of the analog signal requires more complex converters operated at high sample frequencies and more expensive delay elements because more samples have to be delayed. There remains, therefore, a need in the art for a practical system which facilitates the use of digital electronic circuit processing while improving the recovery and separation of the various components within the received television signal.

Accordingly, it is a general object of the present invention to provide an improved video processor. It is a more particular object of the present invention to provide an improved video processor which effectively separates the signal components within a composite video signal with maximum recovery of each signal component.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
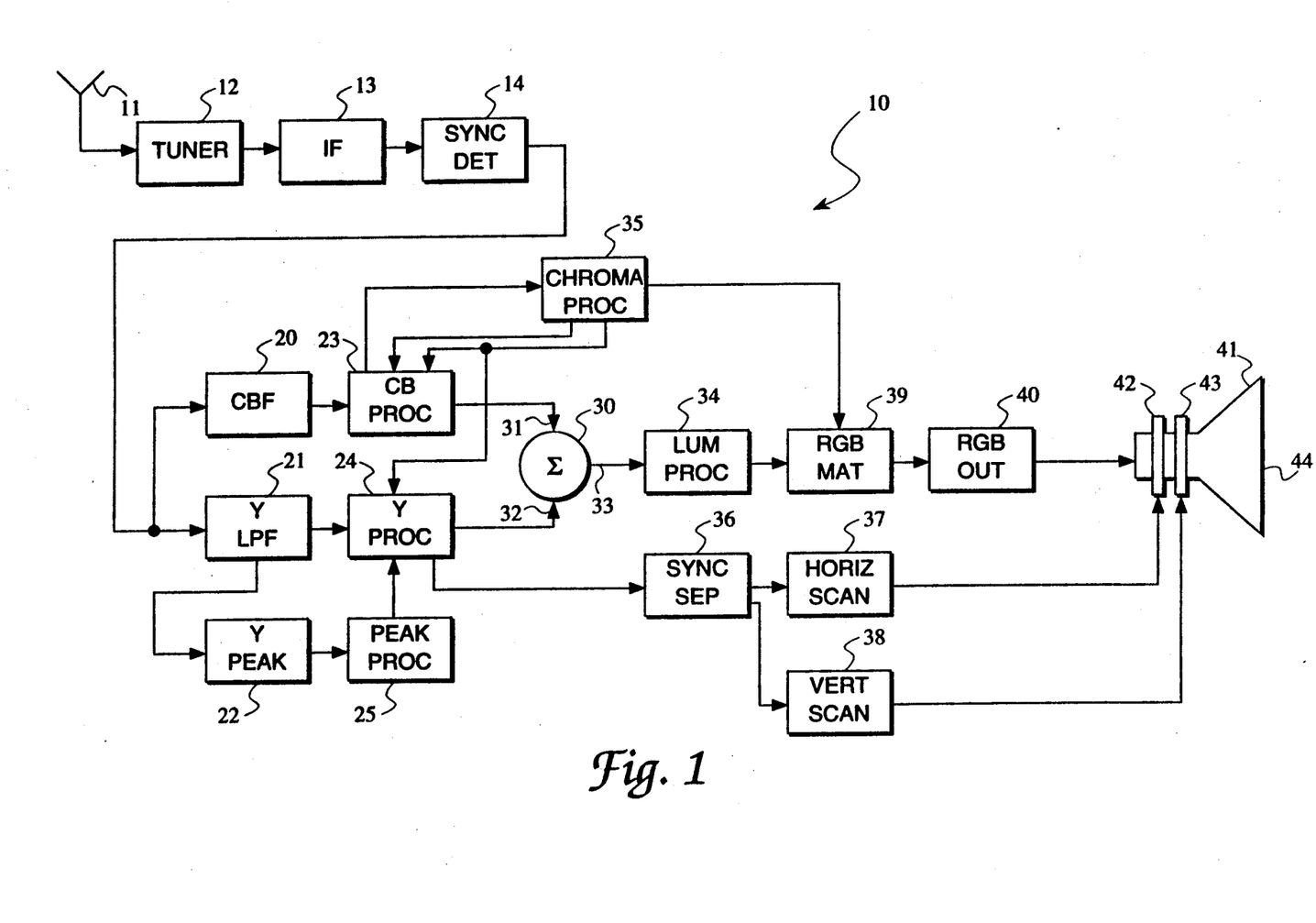
FIG. 1 sets forth a block diagram of a television receiver having a frequency multiplexed video processor constructed in accordance with the present invention.

FIG. 1 sets forth a block diagram of a television receiver constructed in accordance with the present invention and generally referenced by numeral 10. Receiver 1 includes an antenna 11 coupled to a tuner 12. The output of tuner 12 is coupled to an intermediate frequency amplifier 13 which in turn is coupled to a synchronous detector 14. The output of synchronous detector 14 is coupled to frequency selective filters 20 and 21. Filter 21 is further coupled to a filter 22. The output of filter 20 is coupled to a signal processor 23 while the outputs of filters 21 and 22 are coupled to respective signal processors 24 and 25. The output of signal processor 25 is coupled to signal processor 24. Signal processor 23 is coupled to a chrominance processor 35. A summing network 30 includes a pair of inputs 31 and 32 coupled to the outputs of processors 23 and 24 respectively. Summing network 30 further includes an output 33 coupled to the input of a luminance signal processor 34. The latter is coupled to a RGB matrix 39. The output of chrominance processor 35 is also coupled to RGB matrix 39. The output of RGB matrix 39 is coupled to an RGB output circuit 40.

A cathode ray tube 41, constructed in accordance with conventional fabrication techniques, includes a display screen 44 and is coupled to RGB output circuit 40. Cathode ray tube 41 further includes a horizontal deflection yoke 42 and a vertical deflection yoke 43.

Signal processor 24 includes an output coupled to a sync separator 36 which in turn is coupled to a horizontal scan system 37 and a vertical scan system 38. Horizontal scan system 37 is coupled to horizontal yoke 42 while vertical scan system 38 is coupled to vertical deflection yoke 43.

In operation, antenna 11, tuner 12, intermediate frequency amplifier 13 and synchronous detector 14 function in accordance with conventional television system practice to receive a transmitted television signal which is selected by tuner 12 and amplified by intermediate frequency amplifier 13 to a level sufficient to facilitate the operation of synchronous detector 14. The latter performs a synchronous detection process in which the composite video signal which includes the luminance and chrominance as well as the horizontal and vertical synchronizing signals is recovered from the intermediate frequency carrier at the input to synchronous detector 14.

The composite video signal recovered by synchronous detector 14 is applied to filters 20 and 21 and from the latter to filter 22. The frequency responses of filters 20 through 22 are set forth in FIG. 2. With temporary reference to FIGS. 1 and 2 together, FIG. 2A sets forth the response of filter 20 which, in essence, comprises a chrominance signal bandpass filter for an NTSC receiver generally referenced by numeral 50. Thus, frequency response curve 50 defines a passband 51 which is generally centered at the chrominance subcarrier frequency of 3.58 megahertz and which is approximately 1 megahertz wide at the 6 db or "half points" 52 and 53. It will be apparent to those skilled in the art that filter 20 excludes all information within the composite video signal except for the portions thereof having frequencies within response curve 50. In a similar fashion, filter 21 defines a frequency response set forth in FIG. 2B and generally referenced by numeral 55. Response curve 55 defines extended regions 56 and 58 which are pass regions separated by a notch 57 therebetween. Notch 57 is generally coincident with the passband of curves 50 and 65. The 6 db or half points 60 and 6 generally coincide with 6 db points 68 and 53 of curves 67 and 50 in FIG. 2C and 2A respectively. The upper frequency region of response curve 55 defines a slope 59 having a 6 db point 62 at approximately 10 megahertz. Thus, the response curve of filter 21 shown in FIG. 2B essentially passes all frequency components of the composite video signal with the exception of the chrominance bandpass and luminance peaking components. It should also be noted that frequency response 55 of filter 21 is configured to accommodate both NTSC and the newly emerging high definition video signal sources. Accordingly, when used in an NTSC broadcast environment, it will be apparent that very little, if any, luminance information will be contained in the extended frequency portion 58 of curve 55 beyond notch 57.

Figure 2A:
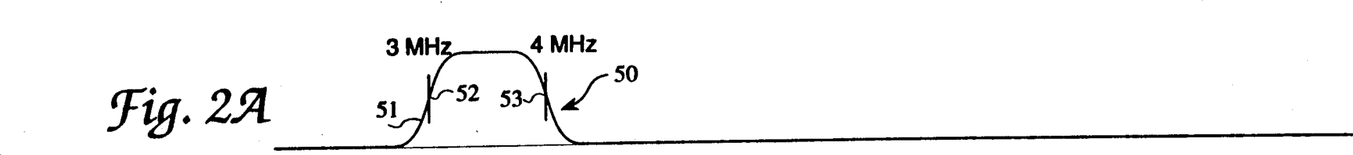
FIGS. 2A through 2F set forth frequency response curves of several portions of the present invention frequency multiplexed video processor.
Figure 2B:
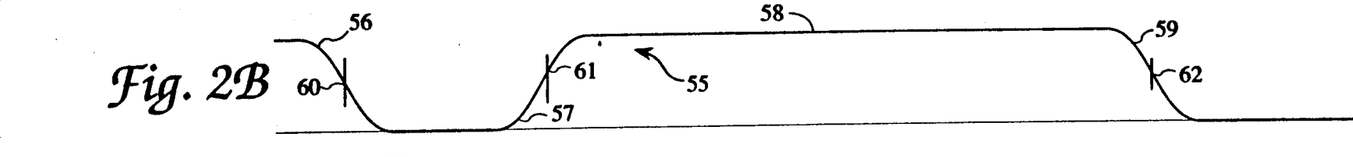
Figure 2C:
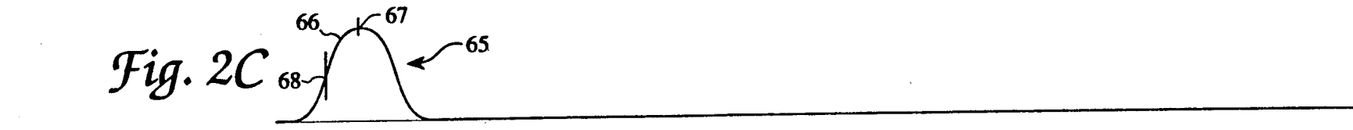

FIG. 2C sets forth the frequency response of filter 22 generally referenced by numeral 65. As can be seen, response curve 65 shows that filter 22 excludes all frequencies with the exception of a relatively narrow passband 66. Passband 66 is centered at a center frequency 67 which, in the present application, is selected to be 2.5 megahertz. The bandwidth and center frequency of bandpass 66 is, to some extent, a matter of design choice and, as is described below in greater detail, is selected to embrace the portion of the luminance signal which benefits the most from luminance or video peaking processes. It has been found advantageous in the present system to utilize a bandwidth of approximately one-half megahertz for bandpass 66.

Returning to FIG. 1, the filtered output signals of filters 20, 21 and 22 are coupled to a corresponding trio of signal processors 23, 24 and 25 respectively. The operations of processors 23, 24 and 25 are set forth below in greater detail. However, suffice it to note here that processor 23 receives both chrominance and luminance signals within the 3 to 4 megahertz frequency bandwidth and as a result includes the color burst and chrominance signals together with 3 to 4 megahertz frequency luminance information. As is also set forth below in greater detail, processor 23 is operative upon the applied signal to perform a separation of the chrominance information from the luminance information and to perform the automatic chromacontrol, or ACC, function upon the chrominance signal components. The chrominance signal is applied to chrominance processor 35. Concurrently, the luminance signal components separated from the chrominance signal components are coupled to a summing network 30 at input 31. As will be also be described below in greater detail, the operation of processor 23 utilizes advantageous digital processing techniques such as digital comb filtering to efficiently recover the chrominance information without sacrificing the important high frequency luminance information in the 3 to 4 megahertz band which in many prior art television receivers is lost.

Processor 24 essentially processes all of the luminance information with the exception of signal components within the chrominance bandwidth processed by processor 23. Accordingly, processor 24 may be thought of as the primary or main luminance signal processor. As is described below in greater detail, processor 24 performs the important functions of providing a video clamping level and utilizes digital circuitry to provide a precise luminance delay network to match the time delay of the luminance signals from processor 23, prior to addition by summing network 30. The output of processor 24 which includes luminance information having frequencies from 0 to 3 megahertz and from 4 to 11 megahertz and which is free of any chrominance information is coupled to input 32 of summing network 30.

Processor 25 is configured to provide supplemental luminance signal processing and is intended to provide the desired luminance signal peaking. The operation of processor 25, therefore, is extremely important to the overall quality and appeal of the displayed image of receiver 10. As is known, the use of luminance signal peaking techniques in which the luminance signal components at significant transition points are emphasized enhances the displayed image. Essentially, the operations of peaking systems provide emphasized preshoot and overshoot components adjacent the luminance signal transitions to sharpen the displayed image and provide a "crisper" display. Processor 25 performs this function in the manner set forth below by separately amplifying the luminance signal components used in luminance peaking. This enhanced peaking signal is coupled to processor 24 and, in the manner set forth below in greater detail, is combined with the luminance signal processed thereby.

Summing network 30 combines the luminance information from processors 23 and 24 to provide a full spectrum luminance signal at output 33 which is applied to luminance processor 34. It should be noted that in accordance with an important aspect of the present invention described below in greater detail, the frequency multiplexing of the present invention system provides for complete recovery of the entire spectrum of luminance frequencies while nonetheless efficiently separating the chrominance signal. In addition, and in further accordance with the present invention, the separation and processing of the peaking frequency luminance signal components for supplemental amplification provides improved image enhancement due to higher quality luminance peaking. The luminance peaking prior to analog-to-digital converter 78 improves signal to noise ratio because the peaking frequency luminance components have optimum use of the dynamic range of the analog-to-digital converter. Luminance processor 34 provides further amplification and processing of the luminance signal for application to RGB matrix 39.

Similarly, chrominance processor 35 is operative in accordance with conventional receiver techniques to recover the color difference signals from the chrominance input from processor 23. The output color difference signals from processor 35 are also applied to RGB matrix 39. Matrix 39 is constructed in accordance with conventional fabrication techniques and, in essence, combines the color difference signals from chrominance processor 35 with the luminance signal from processor 34 to produce RGB color video signals which are amplified by output amplifier 40 and applied to cathode ray tube 41 in further accordance with conventional processing techniques.

Sync separator 36 receives a luminance signal output from processor 24 and separates the horizontal and vertical scan synchronizing signals therefrom which are used to synchronize the operations of horizontal and vertical scan systems 37 and 38 and provide energizing signals for horizontal and vertical yokes 42 and 43 respectively.

Figure 3:
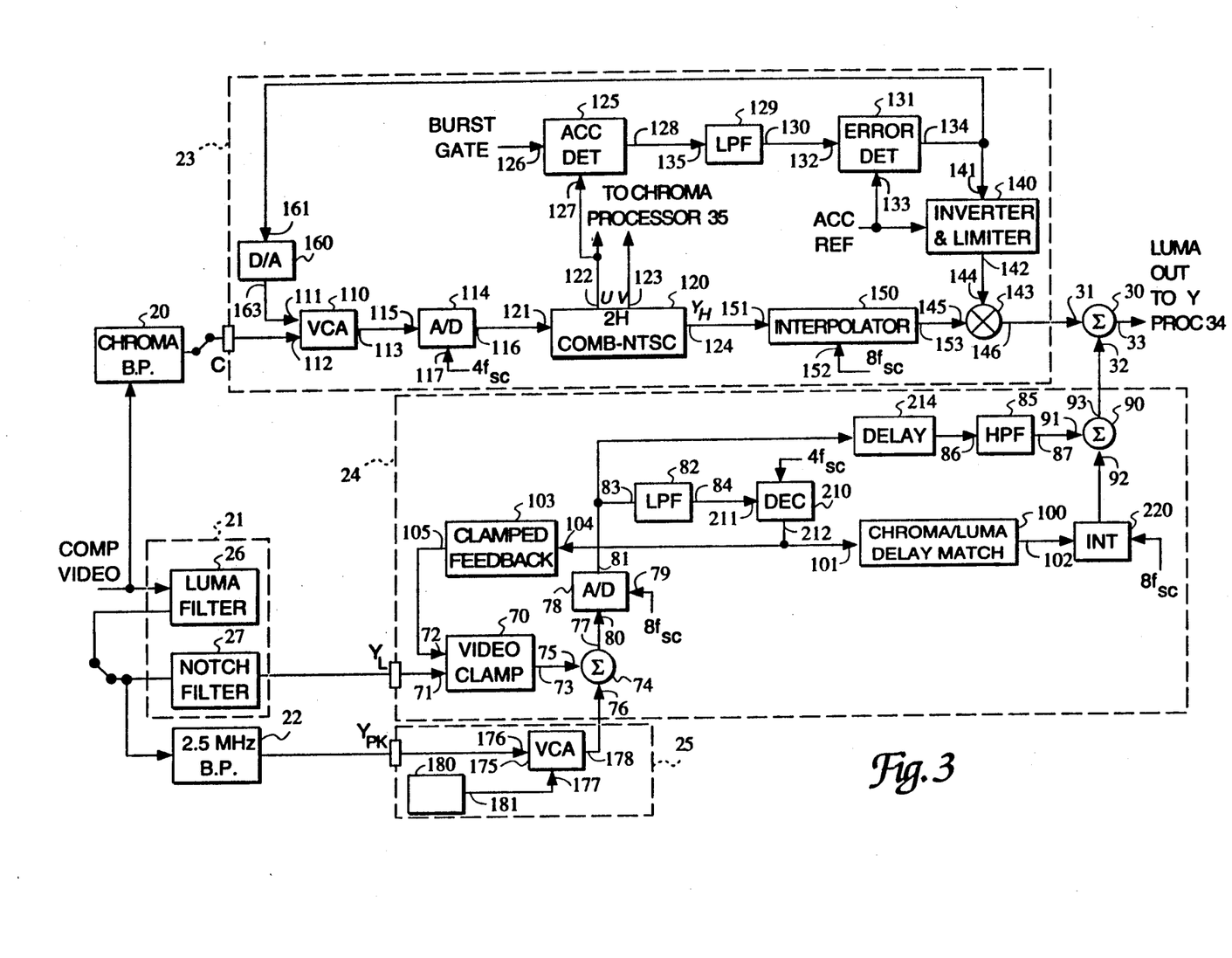
FIG. 3 sets forth a block diagram of the present invention frequency multiplexed video processor.

FIG. 3 sets forth a detailed block diagram of processors 23, 24 and 25 constructed in accordance with the present invention. Also shown in FIG. 3 are input filters 20, 21 and 22. As mentioned above in FIG. 1, the composite video output signal from synchronous detector 14 which includes luminance, chrominance and synchronizing information signals is applied commonly to filters 20 and 21 Filter 21 includes two filter stages 26 and 27 serially coupled between synchronous detector 14 (shown in FIG. 1) and processor 24 and defines the above-mentioned frequency response shown in FIG. 2B which generally excludes chrominance and luminance peaking information. The output of luminance filter 26 is substantially free of chrominance information and is coupled to a notch filter 27 and filter 22. Notch filter 27 defines a complimentary response to bandpass filter 22.

Figure 2D:
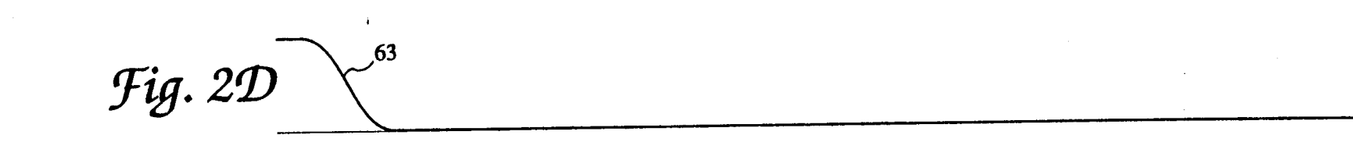

Processor 24 includes a video clamp circuit 70 having an input 71 coupled to notch filter 27, an input 72, and an output 73. The latter is coupled to an input 75 of a summing network 74. An analog-to-digital converter 78 includes an 8 fsc clock signal input 79, an input 80 coupled to output 77 of summer 74 and an output 81. A highpass filter 85, having a frequency response set forth in FIG. 2E, includes an input 86 coupled to output 81 of analog-to-digital converter 78 and an output 87 coupled to input 91 of a summing network 90. A low pass filter 82 having a frequency response corresponding to response curve 63 in FIG. 2D includes an input 83 coupled to output 81 of analog-to-digital converter 78 and an output 84. A clamp feedback circuit 103 includes an input 104 coupled to output 84 of low pass filter 82 and an output 105 coupled to input 72 of video clamp 70. A delay line network 100 includes an input 101 coupled to output 84 of low pass filter 82 and an output 102 coupled to input 92 of summing network 90. The summing network 90 includes an output 93 coupled to input 32 of summing network 30. Delay line 100 provides a delay equal to the required chrominance/luminance time difference plus a one horizontal line delay. The latter is needed to compensate for the one horizontal line delay introduced into the signals processed by the two horizontal line network of comb 120.

Processor 23 includes a gain controlled amplifier 110 having an input 112 coupled to filter 20, a control signal input 111, and an output 113. An analog-to-digital converter 114 includes an input 115 coupled to output 113 of amplifier 110, a clock signal input 117 coupled to a clock signal source having a frequency four times the chrominance subcarrier or "4 fsc" (not shown) and an output 116. A two horizontal line NTSC comb filter 120 includes an input 121 coupled to output 116 of analog to digital converter 114, a pair of chrominance signal outputs 122 and 123, and a luminance signal output 124. A digital interpolator 150 includes an input 151 coupled to luminance output 124 of comb filter 120, a clock signal input 152 coupled to a clock signal source having a frequency eight times the chrominance subcarrier or "8 fsc" (not shown), and an output 153. The latter is coupled to an input 145 of a multiplier network 143. Multiplier network 143 further includes an input 144 and an output 146 with the latter being coupled to input 31 of summing network 30. An automatic chrominance control detector 125 includes an input 126 coupled to a source of burst gating pulse (not shown), an input 127 coupled to output 122 of comb filter 120, and an output 128. A low pass filter 129 includes an input 135 coupled to output 128 of detector 125 and an output 130. An error detector 131 includes an input 132 coupled to output 130 of filter 129, a reference input 133 coupled to a source of ACC reference potential (not shown), and an output 134. An inverter and limiting circuit 140 includes an input 141 coupled to output 134 and an output 142 coupled to input 144 of summing network 143. A digital-to-analog converter 160 includes an input 161 coupled to output 134 of error detector 131 and an output, 163 coupled to control input 111 of gain controlled amplifier 110.

A gain controlled amplifier 175 includes an input 176 coupled to filter 22, a gain control input 177, and an output 178 coupled to input 76 of summing network 74. A source of gain control voltage 180 includes an output 181 coupled to gain control input 177 of gain controlled amplifier 175.

In operation and by way of overview, the circuit of FIG. 3 provides frequency multiplexed luminance and chrominance processing in which processor 24 may be regarded as the primary luminance signal processor. Processor 23 processes the chrominance portion of the applied composite video signal together with the luminance signal components found within the frequency bandwidth of the chrominance signal. Finally, processor 25 is dedicated to the separate processing of the luminance signal components which correspond to luminance transition peaking and thus, in accordance with an important aspect of the present invention, the emphasis thereof may be independently controlled without upsetting the characteristics of the remaining luminance signal component processing.

With respect to the operation of processor 24, it should be recalled that the composite video signal applied to filter 21 is subjected to the frequency response of filter 21 which includes filter sections 26 and 27. As a result, the signal applied to clamp circuit 70 has a frequency characteristic shown in FIG. 2B as curve 55 which may be generally characterized as the luminance signal frequencies above and below the chrominance bandpass frequency together with the scan synchronizing signals. Notch filter 27 provides attenuation of signal components at 2.5 megahertz. Since the signal at input 71 does not contain chroma signal, therefore, the burst signal is removed from the blanking pulse which permits video clamp 70 to operate in a more efficient manner in establishing the appropriate reference level for the luminance signal. The clamping level is established by a digitally encoded reference signal provided by clamped feedback circuit 103 and applied to input 72 of clamp 70. Thus, in response to the applied digitally encoded reference signal, the DC level of the blanking signal within the scan retrace interval is established within clamp 70. Concurrently, blanking pulse clamping establishes the appropriate DC component of the luminance signal.

Filter 22 couples the luminance peaking signal components from the output of filter 26 to gain controlled amplifier 175 where it is amplified in accordance with a gain control voltage provided by peaking control 180. Control 180, in its simplest form, may comprise a consumer adjustable DC control which establishes the desired peaking signal amplitude and "sharpness" of the displayed image. The clamped luminance signal from clamp 70 is combined with the enhanced peaking signal from amplifier 175 by summing network 74 and converted from an analog signal to a digitally encoded signal by converter 78. To maintain the maximum amount of the all-important high frequency luminance signal components within the converted signal, analog-to-digital converter 78 is operated in response to a clock signal input having a relatively high frequency. While the frequency of clock signal used is, to some extent, a matter of design choice, it has been found convenient in the present system to utilize a clock signal having a frequency eight times that of the chrominance subcarrier. The digital signal produced by converter 78 is filtered by a digital low pass filter 82 having a frequency response corresponding generally to response curve 63 in FIG. 2D. The low frequency signal components passed by filter 82 are applied to a decimator in which the digital signal data rate is down converted from 8 fsc to 4 fsc afterwhich it is coupled to clamp feedback circuit 103 which processes the digitally encoded low frequency luminance signals to provide a DC feedback input for clamp 70. Because of the conversion to a digitally encoded signal provided by converter 78, delay matching network 100 may be correspondingly constructed using digital circuit techniques. The data rate reduction of the digital luminance signal produced by decimator 210 facilitates a considerable reduction in this size of delay matching network 100. As mentioned above and in accordance with an important aspect of the present invention, the provision of precise delay of the luminance signal within processor 24 is greatly facilitated in the digital signal environment. The delay of the wider bandwidth luminance signal is required in receivers such as receiver 10 to compensate for the delays associated with the narrow band processing of the chrominance signal and the luminance signal (3 to 4 megahertz), and for the delays in the comb filter and the interpolator. As mentioned above, comb filter 120 is in its preferred form, a two horizontal line comb. While this improves its performance, the two line structure introduces a horizontal line delay which must be compensated within the remainder of the luminance processor. Accordingly, the delay provided by delay network 100 includes this additional horizontal line delay. The digital processing within delay network 100 facilitates the provision of such delays and ensures precise coincidence of the luminance and chrominance signals in the displayed image and enhances overall image quality.

The delayed luminance signal is combined with the remainder of the luminance signal filtered by highpass filter 85, and delayed by delay match 214, within summing network 90. Highpass filter 85 defines a frequency characteristic corresponding to response curve 69 in FIG. 2E and is operative to exclude the low frequency video components selected by low pass filter 82. This exclusion of lower frequency luminance components is necessary to ensure that all low frequency luminance signal components are subjected to the delay within delay network 100. The separation of low frequency and high frequency signal paths facilitates the use of a considerably reduced size delay network because the lower frequency luminance signal can be down converted to a slower data rate of 4 fsc by decimator 210 before processing by delay 100 and thereafter up converted by interpolator 220 back to an 8 fsc data rate prior to application to summing network 90. In addition, it should be noted that the input signals to summing network 90 are digitally encoded signals. Thus, summing network 90 should be understood to include a conventional digital signal adder. The digitally encoded combined signal at the output of summing network 90 is applied to summing network 30 which also comprises a digital signal adder. Thus, processor 24 provides the all important luminance processing operations of proper video clamping together with the imposition of a precise luminance signal delay while maintaining the frequency response shown in FIG. 2B. As a result, the output signal of processor 24 maintains all of the luminance signal components of the input signal within the response shown in FIG. 2B and further includes the enhanced or emphasized luminance peaking signals provided by processor 25. In essence, then, the output signal of processor 24 includes all luminance signals but for those falling within the chrominance signal bandwidth. One important function of processor 23 is to provide the remaining luminance components to complete the luminance signal and provide a full spectrum response.

Turning now to the operation of processor 23, it should be recalled that the input signal to processor 23 comprises the composite video signal from synchronous detector 14 filtered by bandpass filter 20 in accordance with the frequency response shown in FIG. 2A. Thus, the input signal to gain controlled amplifier 110 includes the chrominance and luminance signal information falling within the bandpass shown in FIG. 2A. As is described below in greater detail, gain controlled amplifier 110 has a variable signal gain which, in essence, operates to maintain a constant signal output level for processor 23. Thus, gain controlled amplifier 110 amplifies the applied luminance and chrominance signals and couples them to analog-to-digital converter 114. The signal applied to converter 114 does not include the higher frequency signal components which are applied to converter 78 within processor 24. As a result, a lower frequency clock signal may be utilized which permits the use of a considerably smaller two horizontal line network for comb filter 120. Accordingly, it has been found convenient to utilize a clock signal input to converter 114 having a frequency four times the chrominance subcarrier frequency. Converter 114 operates in accordance with conventional processes to convert the applied analog signal to a corresponding digitally encoded signal which is applied to comb filter 120. It should be recalled that the digitally encoded signal at the output of converter 114 includes both chrominance and luminance signals within the bandpass response of filter 20. Comb filter 120 comprises a digital comb filter which is extremely efficient at separating the luminance and chrominance information from the applied input without sacrificing the important luminance components. As a result, substantial advantage in the efficiency and effectiveness of the present invention system is achieved by the use of digitally encoded signal processing within processor 23. The separated chrominance signal components are coupled to chrominance processor 35 as described above.

It should be noted that while considerable reduction of complexity and economy is realized due to the use of a slower sampling rate in analog-to-digital converter 114 which in turn facilitates the use of a smaller two horizontal line comb network. However, because the resulting luminance signal at output 124 of comb filter 120 is a digitally encoded signal having a lower clock rate than that used in processor 24, the combination of the lower clock rate luminance signal output of comb filter 120 with the higher clock rate luminance signal provided by processor 24, requires the use of interpolator 150 interposed between the luminance signal output of comb filter 120 and summing network 30. Thus, interpolator 150 is operative in response to the same clock signal input utilized by analog-to-digital converter 78 within processor 24. Interpolator 150 functions in accordance with conventional fabrication techniques to convert the slower clock signal output of comb filter 120 to the higher clock signal rate or data rate of the applied clock signal at input 152 thereof. The use of lower frequency converter 114 and interpolator 150 achieves an overall economic advantage in that the two horizontal line memory comb filter 120 will require half as much memory than if the clock rate was twice as fast, because with faster sample rate, the number of video samples in the horizontal line will be higher.

The chrominance output signal of comb filter 120 is further processed by a conventional automatic chrominance control, or ACC, loop formed by ACC detector 125, low pass filter 129 and error detector 131. In accordance with conventional processing techniques, the burst gate pulse applied to detector 125 permits the separation of the reference chrominance signal burst from the remainder of the signal which is then amplitude detected by detector 125 and averaged by low pass filter 129 and compared to a predetermined reference number by detector 131. The output of detector 131 is an amplitude correction signal which is fed back to voltage controlled amplifier 110 through a digital-to-analog converter 160. The use of digital-to-analog converter 160 is required because voltage controlled amplifier 110 is an analog device which responds to an input analog control signal. The resulting operation of the control loop thus formed maintains a substantially constant chrominance signal output level for use by chrominance processor 35.

As a consequence of the operation of the automatic chrominance control or ACC loop within processor 23, a correspondingly constant amplitude is maintained for the luminance signal components which are concurrently amplified by gain controlled amplifier 110. It has been found desirable not to increase the amplitude of the luminance components of the video information in the range of three to four megahertz. Therefore, any increase of these luminance components due to automatic chrominance control action in response to chrominance reference burst decreases is compensated for by the action of multiplier 143. This compensation is accomplished by inverting the chrominance correction signal and applying it to multiplier 143 at input 144. The luminance signal at the output of multiplier 143 is reduced by this inverted correction signal which compensates for the increase caused by the automatic chrominance control amplifier (VCA 110). As a result, luminance signals within the three to four megahertz range are processed using the full dynamic range of analog-to-digital converter 114 while remaining unaffected by the action of the automatic chrominance control system. The negative going chrominance control signal is limited by inverter and limiter 140. As a result, gain reductions implemented by VCA 110 within the automatic chrominance control system which cause reductions of the luminance signal are not compensated for by multiplier 143 since such reductions are not visibly degrading to the displayed luminance signal. The luminance signal output from multiplier 143 is applied to summing network 30. Summing network 30 is also a digital adder combining the luminance signal outputs of processors 23 and 24 to provide a full spectrum luminance signal output which is coupled to luminance processor 34 (seen in FIG. 1).

Figures 2E, 2F:
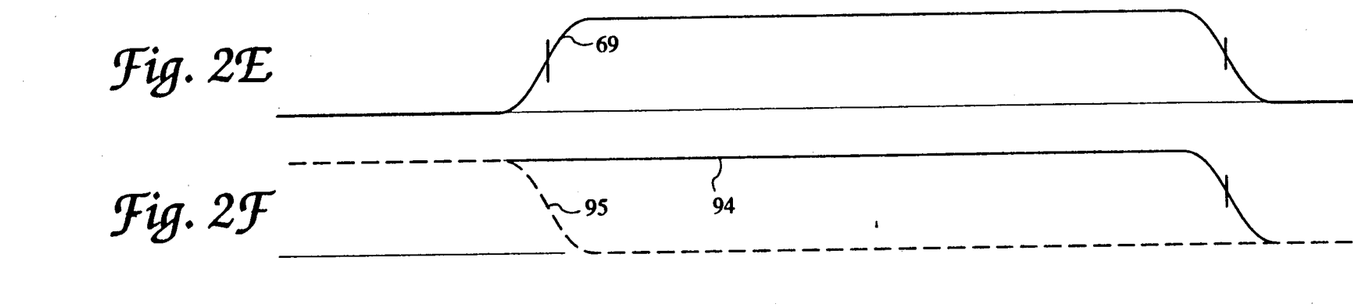

It will be apparent to those skilled in the art that the present invention system shown in FIG. 3 provides substantial advantages over the prior art systems. The use of frequency multiplexing between processors 23, 24 and 25 permits individual attention to each component of the luminance and chrominance signal frequency spectra and minimizes the loss of information within the system. The use of digital signal processing within the present invention system achieves substantial economy of operation as well as improved performance. In addition, the additional frequency multiplexing within processor 24 between low frequency luminance and high frequency luminance components permits the use of an extremely efficient and effective digital delay line without sacrificing high frequency signal response. Also, the frequency separation of luminance peaking components for individual processing by processor 25 permits precise control of luminance peaking without interference or interaction of peaking signals with the remainder of the luminance signal processing. The resulting combined luminance signal applied to luminance processor 34 is shown in FIG. 2F as response curve 94. With temporary reference to FIG. 2F, it should also be noted that dashed line curve 95 represents the effective overall response of the present invention system to an applied NTSC composite video signal. The difference between response curve 95 and the overall response curve of the system 94 is the result of frequency limitations within the NTSC broadcast standard itself and not the present invention system. Thus, in accordance with an important advantage, the present invention system is fully capable of providing the full spectrum response required by newly emerging sources of high resolution television signals.

Figure 4:
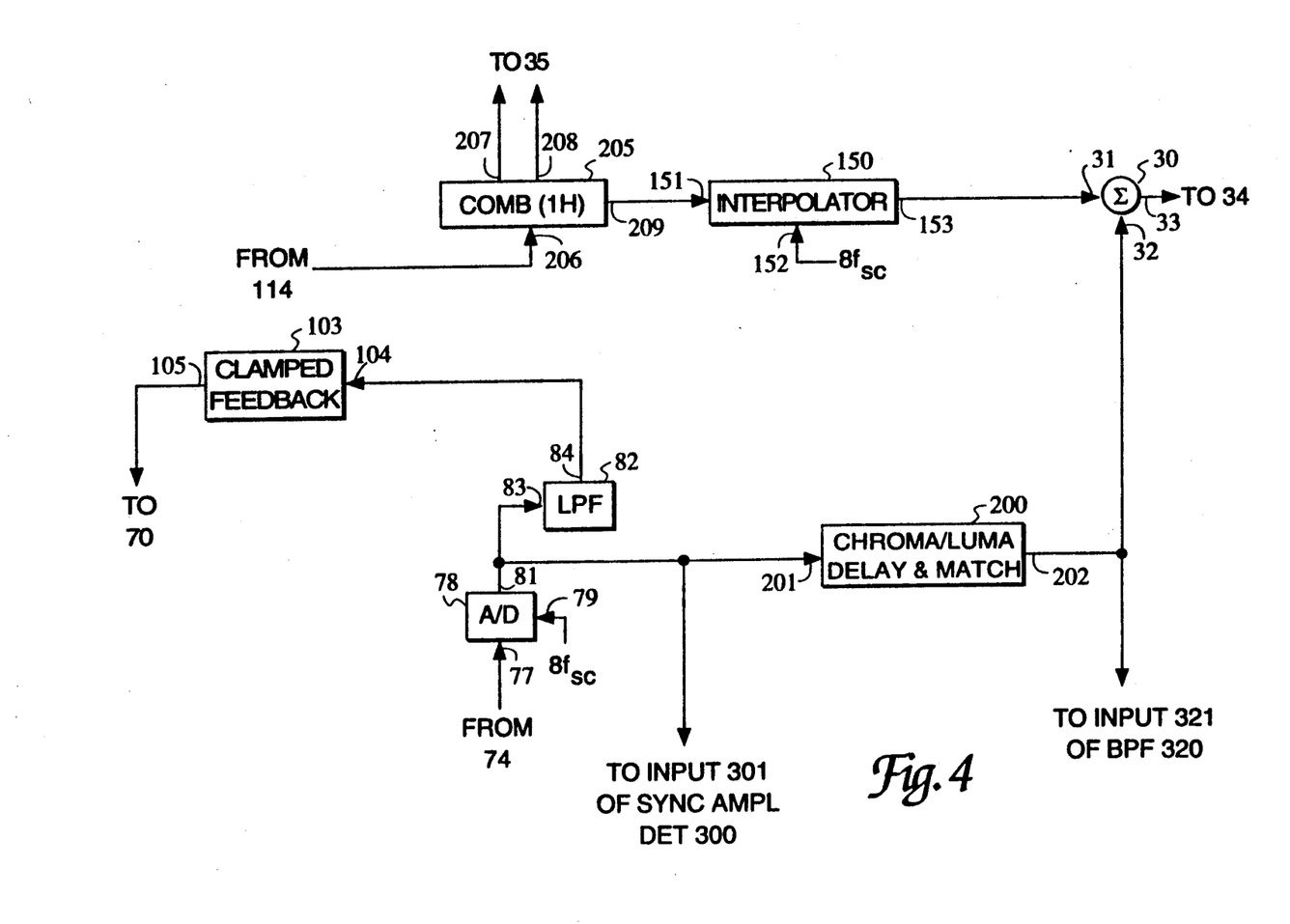
FIG. 4 sets forth a block diagram of an alternate embodiment of the present invention frequency multiplexed video processor.

FIG. 4 sets forth an alternate embodiment of the present invention which is generally the same as the embodiment shown in FIG. 3 with the exception of the use of a smaller comb filter 205 in place of comb filter 120 in the embodiment of FIG. 3. In addition, the embodiment shown in FIG. 4 utilizes a correspondingly smaller delay network 200 in place of delay network 100 and eliminates bandpass filter 85 and summing network 90. The remainder of the embodiment shown in FIG. 4 is identical to the embodiment shown in FIG. 3.

Specifically, analog-to-digital converter 78 includes an input 77 coupled to summing network 74, a clock input 79 and an output 81. Low pass filter 82 includes an input 83 coupled to converter 78 and an output 84 coupled to input 104 of clamp feedback circuit 103. The output of converter 78 is further coupled to an input 201 of a delay network 200. Delay network 200 includes an output 202 coupled directly to input 32 of summing network 30. A one horizontal line comb filter 205 includes an input 206 coupled to analog-to-digital converter 114 (seen in FIG. 3). Comb filter 205 further includes chrominance outputs 207 and 208 coupled to chrominance processor 35 (seen in FIG. 1) and a luminance output 209 coupled to input 151 of interpolator 150. The output of interpolator 150 is coupled to input 31 of summing network 30 in the same manner as set forth in FIG. 3. In further accordance with the embodiment of FIG. 3, the output of summing network 30 is coupled to luminance processor 34 (shown in FIG. 1).

The embodiment of FIG. 4 is configured to facilitate the use of a smaller comb filter 205 having a size corresponding to one horizontal line of information. Accordingly, the one horizontal line structure of comb filter 205 does not introduce the additional horizontal line delay experienced by the two horizontal line comb structure of comb 120 used in the embodiment of FIG. 3. Accordingly, delay network 200 is not required to provide a compensating horizontal line delay and thus comprises a substantially smaller delay network having sufficient delay to provide the required chrominance/luminance time delay. As a result, the luminance output signal from converter 78 need not be separately filtered in the manner provided by filters 82 and 85 in the embodiment of FIG. 3 but may instead be applied directly to input 201 of delay network 200. With the elimination of separate processing through filters 82 and 85 in the manner shown in the embodiment in FIG. 3, the embodiment of FIG. 4 no longer requires summing network 90 and thus the output of delay network 200 may be applied directly to summing network 30. Low pass filter 82 is maintained in the feedback path from converter 78 to clamped feedback network 103 to maintain the desired frequency response of the video clamping network. This embodiment also does not require decimator 210 and interpolator 220 shown in FIG. 3.

Thus, it will be apparent from the examination of FIG. 4 that substantial economy has been obtained in comparison to the embodiment of FIG. 3 by the use of a smaller comb filter, a smaller delay network and the elimination of highpass filter 85, decimator 210, interpolator 220 and summing network 90. Despite the reduced cost of the embodiment shown in FIG. 4 with respect to the embodiment of FIG. 3, however, many of the performance advantages of the present invention system are retained including the frequency multiplexing which provides the individual processing of the luminance signal within the chrominance band, the luminance peaking frequencies, and the extended luminance frequencies processed by processor 24. Thus, the embodiment of FIG. 4, in essence, practices the present invention in a lower cost manner.

What has been shown is a cost effective, efficient and high performance digital video processor for use in a television receiver, computer monitor or other similar processing system. The system utilizes a combination of frequency multiplexing together with sophisticated and cost effective digital electronic circuit processing techniques to provide a high performance processor at a cost effective price.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in an image display system responsive to a composite video signal having luminance information, chrominance information and display synchronization signals, video processing means comprising:
   means for receiving said composite video signal;
   means for frequency dividing said composite video signal into a chrominance band signal, a luminance band signal and a luminance peaking band signal;
   first processor means for processing said chrominance band signal to separate luminance and chrominance information within said chrominance band signal;

second processor means for processing said luminance band signal to establish a predetermined luminance delay in the low frequency portion of said luminance band signal;

third processor means for processing said luminance peaking band signal to adjust the amplitude of said luminance peaking band signal with respect to said luminance band signal; and means for combining said luminance information within said chrominance band signal, said luminance band signal, and said luminance peaking band signal to form a full spectrum luminance signal having enhanced response to said luminance peaking band signal.

2. Video processing means as set forth in claim 1 wherein said second processor means includes:

means for separating the lower frequency portion of said luminance band signal; and means for delaying the separated lower frequency portion of said luminance band signal with respect to said chrominance information.

3. Video processing means as set forth in claim 1 wherein said first processor means includes:

means for establishing a chrominance information amplitude reference;

means for comparing the amplitude of said chrominance information separated by said first processor means to said chrominance information amplitude reference and producing an error signal responsive thereto; and means for amplifying said chrominance and luminance information in response to said error signal.

4. Video processing means as set forth in claim 1 wherein said means for frequency dividing said composite video signal includes:

chrominance filter means for filtering said composite video signal having a chrominance bandpass filter;

luminance filter means for filtering said composite video signal having a luminance band filter defining maximum frequency limit substantially beyond said chrominance bandpass filter and a response notch generally coincident with said chrominance bandpass filter; and peaking filter means for filtering said luminance band signal after said luminance band filter having a peaking filter defining a narrow bandpass response centered at a frequency below said chrominance bandpass filter.

5. Video processing means as set forth in claim 4 wherein said first processor means includes a comb filter operative upon said chrominance band signal.

6. Video processing means as set forth in claim 5 wherein said first processor means and said second processor means include respective first and second converting means for converting said chrominance band signal and said luminance band signal from analog signals to digital signals.

7. Video processing means as set forth in claim 6 wherein said means for combining includes:

means for adding said luminance peaking band signal to said luminance band signal to form a peaked luminance band signal; and means for adding said peaked luminance band signal to said luminance information within said chrominance band signal.

8. Video processing means as set forth in claim 7 wherein said composite video signal includes a reference chrominance burst signal and wherein said means for comparing the amplitude of said chrominance information to said amplitude reference includes a burst amplitude detector responsive solely to said reference chrominance burst signal.

9. For use in an image display system responsive to a composite video signal having luminance information, chrominance information, and display synchronization signals, a video processing method comprising the steps of:

receiving said composite video signal;

frequency dividing said composite video signal into chrominance band signal, a luminance band signal and a luminance peaking band signal;

processing said chrominance band signal to separate luminance and chrominance information within said chrominance band signal;

processing said luminance band signal to establish a predetermined luminance delay in the low frequency portion of said luminance band signal;

processing said luminance peaking band signal to increase the amplitude of said luminance peaking band signal with respect to said luminance band signal; and combining said luminance information within said chrominance band signal, said luminance band signal, and said luminance peaking band signal to form a full spectrum luminance signal having enhanced response to said luminance peaking band signal.

10. The method set forth in claim 9 wherein said step of processing said luminance band signal includes the steps of:

separating the lower frequency portion of said luminance band signal; and delaying the separated lower frequency portion of said luminance band signal with respect to said chrominance information.

11. The method set forth in claim 10 wherein said step of processing said chrominance band signal includes the steps of:

establishing a chrominance information amplitude reference;

comparing the amplitude of said chrominance information separated by said first processor means to said chrominance information amplitude reference and producing an error signal responsive thereto; and amplifying said chrominance and luminance information within said chrominance band signal in response to said comparison.

12. The method set forth in claim 11 wherein said step of frequency dividing said composite video signal includes the steps of:

filtering said composite video signal through a chrominance bandpass filter;

filtering said composite video signal through a luminance band filter having maximum frequency limit substantially beyond said chrominance bandpass filter and a response notch generally coincident with said chrominance bandpass filter; and filtering said luminance band signal after said luminance band filter through a filter having a narrow bandpass response centered at a frequency below said chrominance bandpass filter.

13. The method set forth in claim 12 wherein said step of processing said chrominance band signal includes comb filtering said chrominance band signal.

14. The method set forth in claim 13 wherein said steps of processing said chrominance band signal and processing said luminance band signal each include the step of converting said signals from analog signals to digital signals.

15. The method set forth in claim 14 wherein said combining step includes the steps of:
adding said luminance peaking band signal to said luminance band signal to form a peaked luminance band signal; and
adding said peaked luminance band signal to said luminance information within said chrominance band signal.

16. The method set forth in claim 15 wherein said composite video signal includes reference chrominance burst signal and wherein said step of comparing the amplitude of said chrominance information to said amplitude reference responds solely to said reference chrominance burst signal.

17. For use in a display system responsive to a composite video signal having frequency-overlapping luminance and chrominance signals, a video processor comprising:
frequency multiplexing means for separating said composite video signal into a broadband luminance signal, a narrow band luminance signal centered at a luminance peaking frequency and a chrominance band signal having a chrominance band luminance signal and a chrominance signal;
peaking means coupled to said frequency multiplexing means for amplifying said narrow band luminance signal;
means for separating said chrominance band luminance signal from said chrominance signal;
delay means for delaying at least a portion of said broadband luminance signal with respect to said chrominance signal; and
combining means for combining said broadband luminance signal, said amplified narrow band luminance signal, and said chrominance band luminance signal.

18. A video processor as set forth in claim 17 wherein said frequency multiplexing means includes chrominance band means for separating said chrominance signal and said chrominance band luminance signal from the remainder of said composite video signal and converting them to a digital signal having a first data rate.

19. A video processor as set forth in claim 18 wherein said chrominance band means includes:
a digital comb filter having an input and an output for separating said chrominance signal and luminance signal from said chrominance band signal; and
an interpolator coupled to said comb filter output up converting the output signal of said comb filter to a second data rate which is greater than said first data rate.

* * * * *